United States Patent
Kim et al.

(10) Patent No.: US 6,894,732 B2
(45) Date of Patent: May 17, 2005

(54) DISPLAY APPARATUS HAVING IMPROVED INTERCONNECTION TO VIDEO PRINTED CIRCUIT BOARD

(75) Inventors: Kwey-Hyun Kim, Suwon (KR); You-Sub Lee, Kunpo (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 475 days.

(21) Appl. No.: 09/996,771

(22) Filed: Nov. 30, 2001

(65) Prior Publication Data

US 2003/0035076 A1 Feb. 20, 2003

(30) Foreign Application Priority Data

Aug. 16, 2001 (KR) ..................................... 2001-049322

(51) Int. Cl.[7] .............................................. H04N 5/645
(52) U.S. Cl. ........................................... 348/836; 315/3
(58) Field of Search ........................ 348/836, 8.5, 825, 348/828, 829, 830; 315/3; 439/366; 361/682, 752; 313/3

(56) References Cited

U.S. PATENT DOCUMENTS

| | | | | |
|---|---|---|---|---|
| 3,637,932 A | * | 1/1972 | Wigley | .................. 348/839 |
| 4,048,669 A | * | 9/1977 | Bowler et al. | .............. 361/726 |
| 4,054,346 A | * | 10/1977 | Schultz | ...................... 439/366 |
| 4,646,159 A | * | 2/1987 | Beaumont et al. | .......... 348/836 |
| 5,691,781 A | | 11/1997 | Siccardo | |
| 5,929,945 A | | 7/1999 | Negishi et al. | |
| 5,949,493 A | * | 9/1999 | Mudra et al. | ................ 348/553 |

FOREIGN PATENT DOCUMENTS

| | | |
|---|---|---|
| JP | 6-51713 | 2/1994 |
| JP | 7-11066 | 2/1995 |
| JP | 11-75143 | 3/1999 |
| JP | 3072615 | 8/2000 |
| KR | 1994-18504 | 8/1994 |
| KR | 1995-6856 | 8/1995 |
| KR | 1997-48241 | 7/1997 |
| KR | 1999-40349 | 11/1999 |

* cited by examiner

Primary Examiner—Victor R. Kostak
(74) Attorney, Agent, or Firm—Robert E. Bushnell, Esq.

(57) ABSTRACT

A display apparatus has a cathode ray tube bulb which includes a panel displaying a picture thereon, a funnel combined with the panel, and a neck connected to the funnel. The display apparatus further comprises an electron gun unit which includes an electron gun main body inserted into the neck and a boss part protruding from the neck at a rear part of the electron gun main body and having a plurality of pins disposed therearound, and a video unit which includes a video PCB disposed parallel to the axis of the neck and a boss holder vertically provided on the video PCB and combined with the boss part so as to transmit a video signal from the video PCB to the electron gun unit. With this configuration, space for installation of the video PCB is minimized, and the video unit is not easily separated from an electron gun unit.

20 Claims, 5 Drawing Sheets

DISPLAY APPARATUS HAVING IMPROVED INTERCONNECTION TO VIDEO PRINTED CIRCUIT BOARD

CLAIM OF PRIORITY

This application makes reference to, incorporates the same herein, and claims all benefits accruing under 35 U.S.C. §119 from my application DISPLAYING APPARATUS filed with the Korean Industrial Property Office on 16 Aug. 2001 and there duly assigned Serial No. 49332/2001.

BACKGROUND OF THE INVENTION

1. Technical Field

The present invention relates in general to a display apparatus and, more particularly, to an improved display apparatus embodied in the combination of an electron gun unit and a video unit.

2. Related Art

The term "display apparatus" collectively refers to monitors for a TV set or a computer system, and includes an LCD (liquid crystal display) monitor, a CRT (cathode ray tube) monitor, and a CDT (color display tube) monitor. Generally, the CDT monitor and the CRT monitor are monitors for the computer system and the TV set employing a cathode ray tube bulb. Hereinbelow, the term "CRT monitor" will be used to cover the CDT monitor.

A display apparatus for a CRT monitor comprises: a cathode ray tube bulb which has a panel, a funnel, and a neck; an electron gun unit inserted into the neck of the cathode ray tube bulb and emitting an electron beam into the cathode ray tube bulb; and a video unit combined with the electron gun unit and transmitting a video signal to the cathode ray tube bulb.

The video unit includes a video PCB (printed circuit board) vertically disposed relative to the electron gun unit, and a boss holder provided on the video PCB so as to be combined with a boss part of the electron gun unit.

If the electron gun unit emits an electron beam into the cathode ray tube bulb according to the intensity of the video signal from the video PCB, the electron beam collides with fluorescent materials of monochrome or RGB (red, green, blue) colors coated on an inner surface of the panel, thereby displaying a picture on the panel.

In such a display apparatus, there is a need for space because the electron gun unit is vertically combined with the video PCB.

The length of the space is an important factor in the size of a rear casing. Thus, as the height elongates, the rear casing increases in size, thereby making compact design difficult. Moreover, with respect to the structure of the video PCB, if there is a force acting in the space, the video PCB is likely to be easily separated from the electron gun unit.

The following are considered to be generally pertinent to the present invention but are burdened by the disadvantages set forth above: U.S. Pat. No. 5,691,781 to Siccardo, entitled FIXATION OF CATHODE RAY TUBE IN TV RECEIVER CABINET, issued on 25 Nov. 1997, Japanese Utility Model No. 3072615 to Urisu, entitled AN IMAGE OUTPUT DEVICE AND A TELEVISION SET, issued on 2 Aug. 2000, Japanese Patent Publication No. 07-11066 to Ohara, entitled METHOD FOR MODIFYING OLEFINIC RESIN, published on 14 Feb. 1995, Japanese Patent Publication No. 06-51713 to Ishibashi, entitled CONNECTION SYSTEM FOR CIRCUIT BOARD OF CRT MOUNTED EQUIPMENT, published on 25 Feb. 1994, Japanese Patent Publication No. 11-75143 to Takechi, entitled CRT ATTACHMENT STRUCTURE, published on 16 Mar. 1999, Korean Utility Model No. 1995-6856 to Kwan-Joon Hwang, entitled *CRT COUPLING APPARATUS*, issued on Aug. 21, 1995, Korean Patent Publication No. 1994-18504 to Detmar Harting et al., entitled *MAGNE SYSTEM FOR SELECTION BLOCK IN TEXTILE MACHINES*, published on 18Aug. 1994, Korean Patent Publication No. 1997-48241 to Byung-Jik Koh, entitled *CRT NECK COUPLER*, published on 31 Jul. 1997, and Korean Patent Publication No. 1999-40349 to Heung-Shin Park, entitled *CRT SOCKET BOARD STRUCTURE IN A MONITAR*, published on 25 Nov. 1999.

SUMMARY OF THE INVENTION

Accordingly, the present invention has been developed while keeping in mind the above-described shortcomings and the needs of the users, and an object of the present invention is to provide a display apparatus in which the space needed for installation of a video PCB is minimized.

Another object of the present invention is to provide a display apparatus in which a video unit is not easily separated from an electron gun unit.

These and other objects of the present invention are accomplished by the provision of a display apparatus having a cathode ray tube bulb which includes a panel displaying a picture thereon, a funnel combined with the panel, and a neck combined to the funnel. The display apparatus further comprises an electron gun unit which includes: an electron gun main body inserted into the neck, with a boss part protruding out of the neck at a rear end part of the electron gun main body and having a plurality of pins therearound; and a video unit including a video PCB disposed parallel to the axis of the neck, and a boss holder vertically provided on the video PCB and combined with the boss part so as to transmit a video signal from the video PCB to the electron gun unit.

Preferably, the video PCB is horizontally installed under the neck, and a plurality of pinholes, into which pins of the electron gun unit are inserted, is provided around the boss holder.

The display apparatus further comprises a neck fixing holder provided on the video PCB and fastening the neck so that the video unit is not easily separated from the electron gun unit.

Preferably, the neck fixing holder is comprised of a pair of ring holders into which the neck is inserted. Further, the video PCB preferably has a relatively narrow width at the rear part thereof in order to take up a minimal amount of space and provide a compact design.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DETAILED DESCRIPTION OF THE PREFERRED EMBODIMENT

The present invention will be described in more detail with reference to the accompanying drawings.

Figure 1:
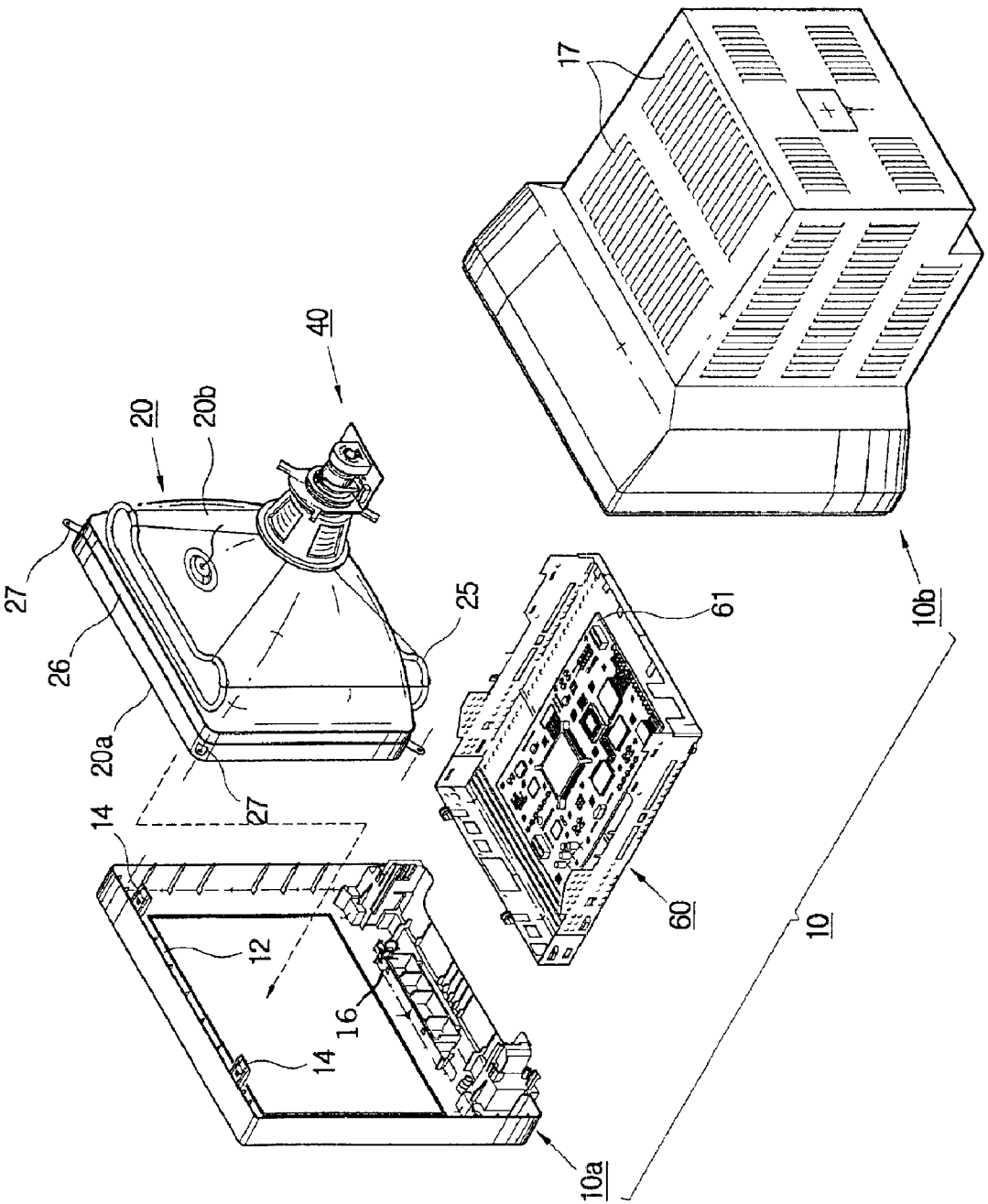
FIG. 1 is an exploded perspective view of a display apparatus according to the present invention.

FIG. 1 is an exploded perspective view of a display apparatus according to the present invention. As shown in FIG. 1, the display apparatus according to the present invention comprises a casing 10 forming an external appearance, a cathode ray tube bulb 20 provided in the casing 10, an electron gun unit 30 (see FIG. 3) emitting an electron beam into the cathode ray tube bulb 20, a video unit 40 combined with the electron gun unit 30 and transmitting a video signal to the cathode ray tube bulb 20, and a substrate frame 60 on which a main PCB (printed circuit board) 61 transmitting an electric signal to the cathode ray tube 20 is mounted.

The casing 10 includes a front casing 10a and a rear casing 10b which combine with each other to surround the cathode ray tube bulb 20. In the front casing 10a, there is provided an opening through which a picture appearing on a panel 20a of the cathode ray tube bulb 20 is displayed. In an upper part of the front casing 10a, there is provided a plurality of snaps 14 protruding toward the rear casing 10b for connecting the front casing 10a with the rear casing 10b. In a lower part of the front casing 10a, there is provided a supporter 16 for supporting a lower part of the cathode ray tube bulb 20.

In an upper part of a front side of the rear casing 10b, there is provided a plurality of snap holders (not shown) for holding the snaps 14 of the front casing 10a. On an outer surface of the rear casing 10b, there is provided a plurality of slots 17 through which heat generated within rear casing 10b is expelled.

Figure 2:
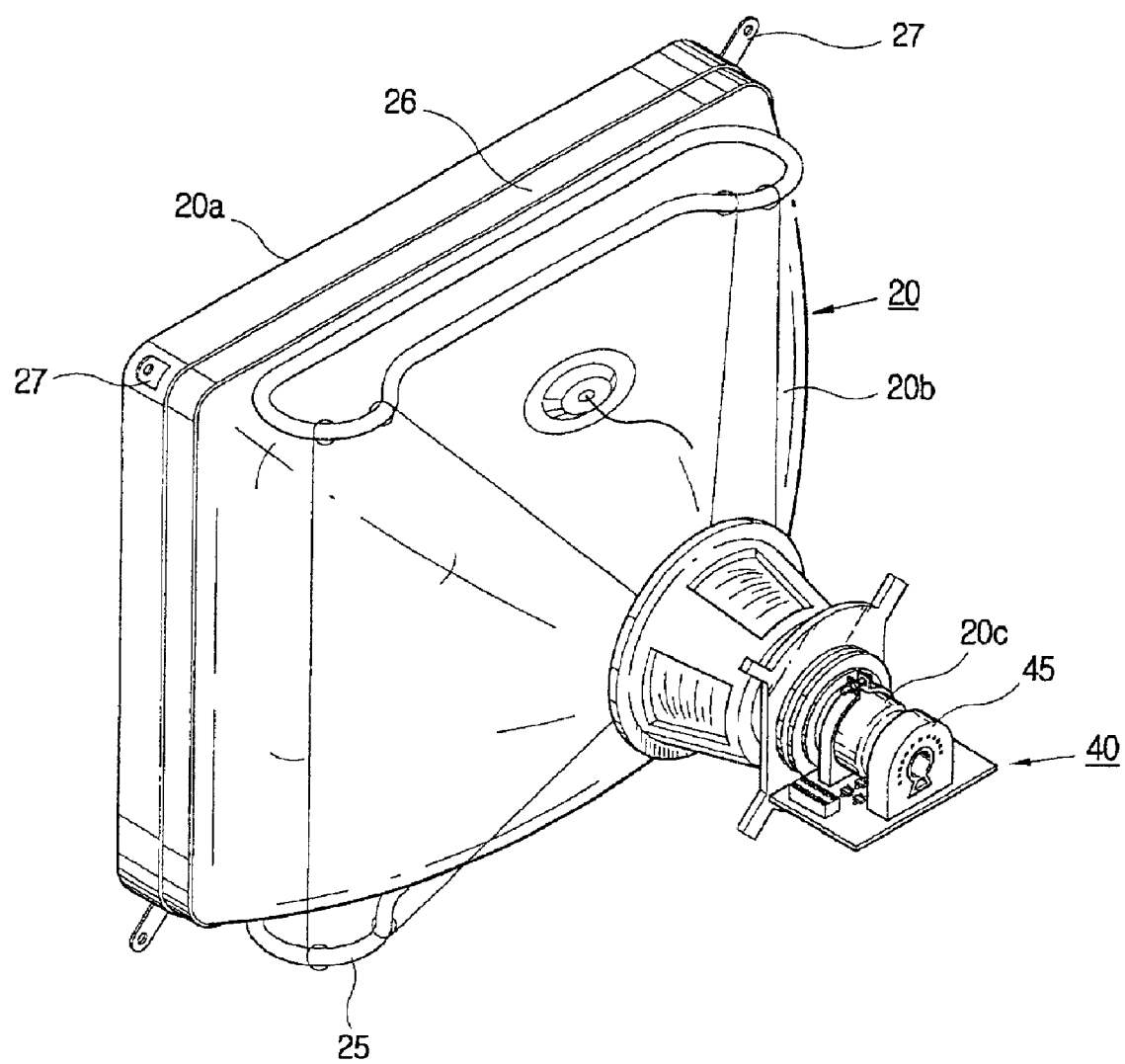
FIG. 2 is an enlarged perspective view of a part of the display apparatus of FIG. 1.

FIG. 2 is an enlarged perspective view of a part of the display apparatus of FIG. 1. As shown in FIG. 2, the cathode ray tube bulb 20 includes the panel 20a on which a picture appears for display through the opening 12, a funnel 20b combined with the panel 20a, and a neck 20c connected to an end of the funnel 20b.

On the outside of the cathode ray tube bulb 20, there is provided a degaussing coil 25 for blocking a magnetic field generated by internal components.

On the circumference of the front part of the cathode ray tube bulb 20, there is provided a combining band 26 made of metal. At every corner of the combining band 26, a combining part 27 is formed with a screw hole for connection to a boss (not shown) protruding from the rear of the front casing 10a.

To a neck 20c of the cathode ray tube bulb 20, there is combined an electron gun unit 30. The electron gun unit 30 emits an electron beam into the cathode ray tube bulb 20, and makes the electron beam collide with fluorescent materials of monochrome or RGB (red, green, blue) colors coated on an inner surface of the panel 20a, thereby displaying a picture on the panel 20a.

Figure 3:
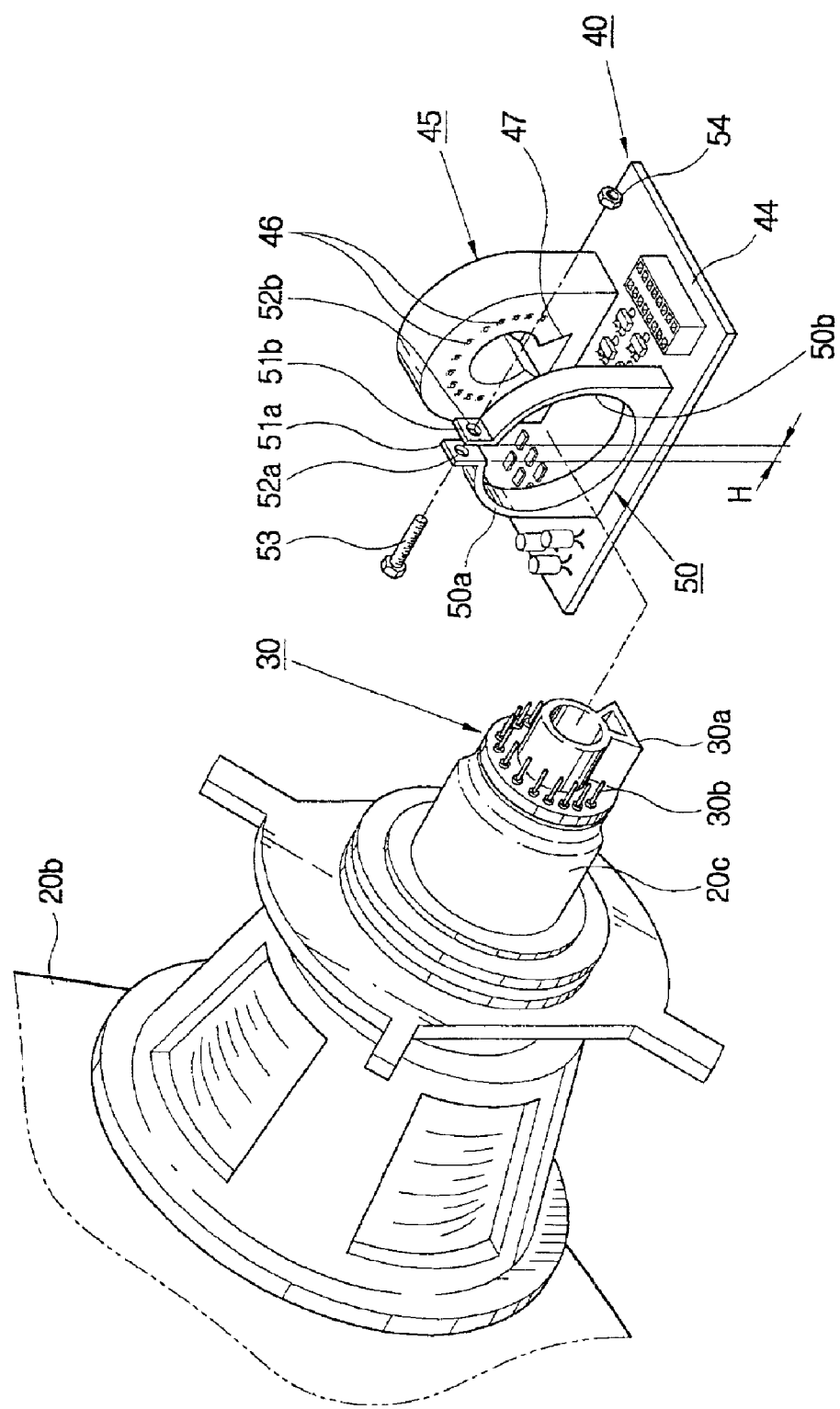
FIG. 3 is an enlarged perspective view of an electron gun unit.
Figure 4:
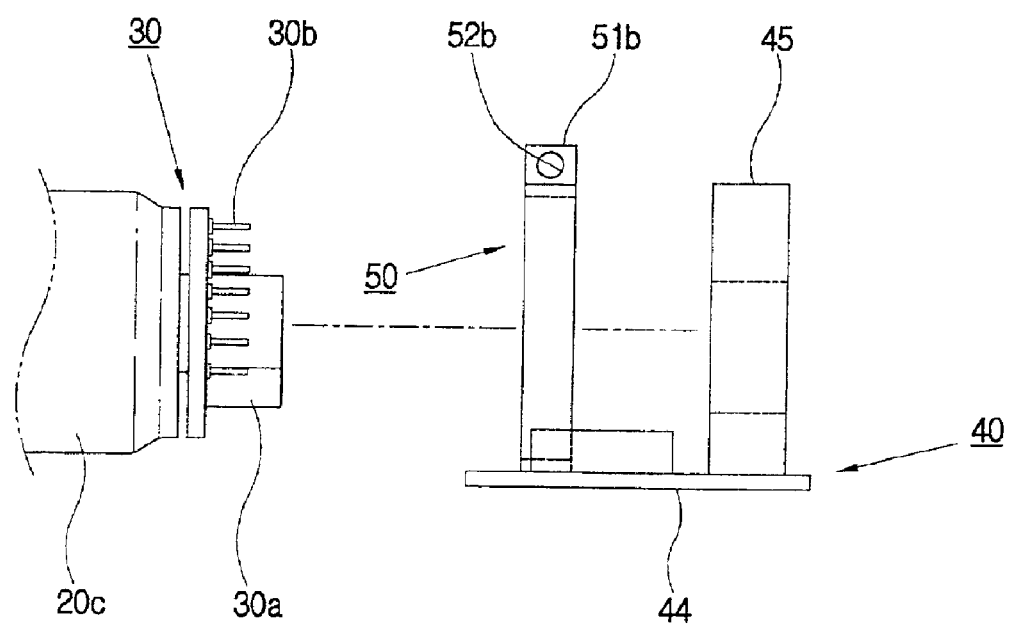
FIG. 4 is a schematic exploded side view of FIG. 3.

FIG. 3 is an enlarged perspective view of an electron gun unit, and FIG. 4 is a schematic exploded side view of FIG. 3. As shown in FIGS. 3 and 4, the electron gun unit 30 includes an electron gun main body (not shown) inserted into the neck 20c of the cathode ray tube bulb 20, and a boss part 30a provided at a rear end of the electron gun main body and protruding from the neck 20c. The boss part 30a has a non-circular section in order to prevent the video unit 40 from revolving when the boss part 30a is combined with a boss holder 45. Around the boss part 30a, a plurality of pins 30b is provided so as to be plugged into pinholes 46 provided on the boss holder 45, thereby providing an electric connection therebetween.

The video unit 40 includes a video PCB 44 horizontally installed relative to the neck 20c, and the boss holder 45 is disposed vertically on the video PCB 44 so as to be combined with the boss part 30a and to transmit a video signal to the electron gun unit 30 from the video PCB 44.

The video PCB 44 is substantially horizontally installed under the neck 20c, and has a rectangular shape similar to the shape of a general PCB. Although not illustrated, the video PCB 44 may have a relatively narrow width at the rear part thereof in order to take up a minimal amount of space.

The boss holder 45 has a boss accommodating hole 47 which has a shape corresponding to the shape of the boss part 30a. Around the boss accommodating hole 47, there are provided pinholes 46 into which the pins 30b provided on the electron gun unit 30 are inserted for electric connection therebetween.

On the video PCB 44, there is provided a neck fixing holder 50 which is spaced from the boss holder 45, and which supports the neck 20c when the boss part 30a is combined with the boss holder 45.

The neck fixing holder 50 comprises a pair of ring holders 50a and 50b having an elasticity for holding the neck 20c. At the ends of the ring holders 50a and 50b, flange parts 51a and 51b are, respectively, provided and they are spaced apart from each other with a predetermined gap (H). On the flange parts 51a and 51b, there are formed through holes 52a and 52b, respectively, facing each other. A bolt 53 is inserted into through holes 52a and 52b so that the neck 20c is fastened by closing the gap H between flange parts 51a and 51b using the bolt 53 and a nut 54.

Thus, the neck 20c is inserted between the pair of ring holders 50a and 50b, and the neck 20 is coupled to the pair of ring holders 50a and 50b by closing the gap (H) between the ring holders 50a and 50b using the bolt 53 and the nut 54. Accordingly, the video unit 40 is prevented from being easily separated from the electron gun unit 130.

Where the neck fixing holder 50 and the boss holder 45 are provided on the video PCB 44, it is desirable that the neck fixing holder 50 and the boss holder 45 be installed on a separate pad (not shown) provided on the video PCB 44 in order to prevent the video PCB 44 from being damaged.

Alternatively, a clamp or a cable-tie may be provided in place of the neck fixing holder 50. Further, the video PCB 44 may be protected with a separate metal case.

With this configuration, the process of combining the video unit 40 and the electron gun unit 30 will be described hereinbelow.

Firstly, the neck 20c is inserted between the pair of ring holders 50a and 50b on the video PCB 44, with the video PCB 44 being under the neck 20c. Thereafter, in order to combine the boss part 30a with the boss holder 45, the video PCB 44 is firmly pressed against the neck 20c. At this point, each pin 30b around the boss part 30a is correspondingly inserted into a respective pinhole 46 in the boss holder 45.

Thereafter, the flange parts 51a and 51b of the pair of ring holders 50a and 50b are closed upon each other by means of the bolt 53 and the nut 54. In this manner, the pair of ring holders 50a and 50b closely contact the neck 20, thereby completing the interconnection of the electron gun unit 30 and the video unit 40.

With this combined structure, the video unit 40 is connected to the electron gun unit 30, and the space occupied by the video unit 40 is minimized. Further, even if an external force acts horizontally on the video unit 40, the video unit 40 is not easily separated from the electron gun unit 30 due to the neck fixing holder 50.

As described above, according to the present invention, the combined structure of the electron gun unit 30 and the video unit 40 is improved, thereby preventing the video unit 40 from being easily separated from the electron gun unit 30. Moreover, the space consumed by the combined structure of the electron gun unit 30 and video unit 40 is minimized.

Figure 5:
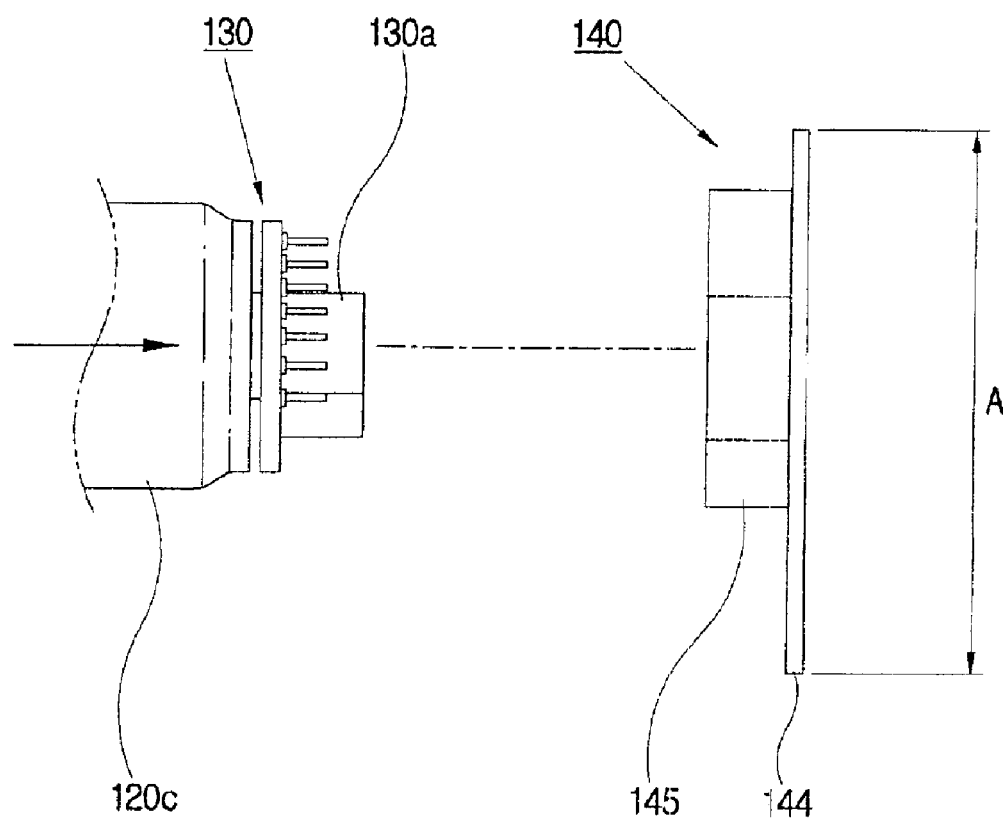
FIG. 5 is a schematic exploded side view of a electron gun unit corresponding to the electron gun unit of FIG. 4, but having disadvantages overcome by the present invention.

FIG. 5 is a schematic exploded side view of an electron gun unit corresponding to the electron gun unit of FIG. 4 but having disadvantages overcome by the present invention. As shown in FIG. 5, a display apparatus for a CRT monitor comprises: a cathode ray tube bulb (not shown) formed by combining a panel (not shown), a funnel (not shown), and a neck 120c; an electron gun unit 130 inserted into the neck 120c of the cathode ray tube bulb, and emitting an electron beam into the cathode ray tube bulb; and a video unit 140 combined with the electron gun unit 130, and transmitting a video signal to the cathode ray tube bulb.

The video unit 140 includes a video PCB (printed circuit board) 144 vertically disposed relative to the electron gun unit 130, and a boss holder 145 provided on the video PCB 144 so as to be combined with a boss part 130a of the electron gun unit 130.

If the electron gun unit 130 emits the electron beam into the cathode ray tube bulb according to the intensity of the video signal from the video PCB 144, the electron beam collides with fluorescent materials of monochrome or RGB (red, green, blue) colors coated on an inner surface of the panel, thereby displaying a picture on the panel.

In the display apparatus shown in FIG. 5, there is a need for a space having a height "A" because the electron gun unit 130 is vertically combined with the video PCB 144.

The length "A" is an important factor in the size of a rear casing (not shown). Thus, as the height "A" elongates, the rear casing will increase in size, thereby making a compact design difficult. Moreover, in the combination structure of the video PCB 144, if there is a force acting in a direction of an arrow shown in FIG. 5, the video PCB 144 is likely to be easily separated from the electron gun unit 130.

In contrast, as described above, the present invention provides a display apparatus in which space is minimized, and in which the video unit is not easily separated from the electron gun unit.

Although the preferred embodiments of the present invention have been disclosed for illustrative purpose, those skilled in the art will appreciate that various modifications, additions and substitutions are possible without departing from the scope and spirit of the invention, as recited in the accompanying claims.

What is claimed is:

1. A display apparatus having a cathode ray tube bulb which includes a panel displaying a picture thereon, a funnel combined with the panel, and a neck combined with the funnel, said apparatus further comprising:
   an electron gun unit including an electron gun main body inserted into the neck, and a boss part protruding from the neck at a rear end part of the electron gun main body and having a plurality of pins arranged thereon; and
   a video unit including a video printed circuit board (PCB) disposed parallel to an axis of the neck, and a boss holder vertically provided on the video PCB and connected to the boss part so as to transmit a video signal from the video PCB to the electron gun unit.

2. The display apparatus according to claim 1, wherein the video PCB is horizontally installed under the neck.

3. The display apparatus according to claim 1, wherein the boss holder has a plurality of pinholes formed therein for receiving the plurality of pins of the electron gun unit.

4. The display apparatus according to claim 1, further comprising a neck fixing holder provided on the video PCB for fastening the neck to the video PCB.

5. The display apparatus according to claim 4, wherein the neck fixing holder comprises a pair of ring holders into which the neck is inserted.

6. The display apparatus according to claim 5, further comprising connecting means for connecting the ring holders to each other when the neck is inserted into the ring holders.

7. A display apparatus, comprising:
   an electron gun unit including a main body and a boss part protruding from a rear part of the main body, said boss part having a plurality of pins disposed thereon and extending rearwardly therefrom; and
   a video unit including a video printed circuit board (PCB) disposed parallel to an axis of the electron gun unit, and a boss holder vertically disposed on the video PCB for connection to the boss part of the electron gun unit so as to transmit a video signal from the video PCB to the electron gun unit.

8. The display apparatus according to claim 7, wherein the boss holder has a plurality of pinholes formed therein for receiving the plurality of pins of the boss part.

9. The display apparatus according to claim 7, wherein the electron gun unit is inserted into a neck of a cathode ray tube bulb, and the video PCB is horizontally installed under the neck of the cathode ray tube bulb.

10. The display apparatus according to claim 9, further comprising a neck fixing holder provided on the video PCB for fastening the neck to the video PCB.

11. The display apparatus according to claim 10, wherein the neck fixing holder comprises a pair of ring holders into which the neck is inserted.

12. The display apparatus according to claim 11, further comprising connecting means for connecting the ring holders to each other when the neck is inserted into the ring holders.

13. A display apparatus, comprising:
   an electron gun unit including a main body and a boss part protruding from a rear part of the main body, said boss part having a plurality of pins disposed thereon and extending rearwardly therefrom; and
   a video unit including a video printed circuit board (PCB) and a boss holder vertically disposed on the video PCB for connection to the boss part of the electron gun unit so as to transmit a video signal from the video PCB to the electron gun unit;
   wherein the electron gun unit is inserted into a neck of a cathode ray tube bulb, and the video PCB is horizontally installed under the neck of the cathode ray tube bulb.

14. The display apparatus according to claim 13, wherein the boss holder has a plurality of pinholes formed therein for receiving the plurality of pins of the boss part.

15. The display apparatus according to claim 13, further comprising a neck fixing holder provided on the video PCB for fastening the neck to the video PCB.

16. The display apparatus according to claim 15, wherein the neck fixing holder comprises a pair of ring holders into which the neck is inserted.

17. The display apparatus according to claim 16, further comprising connecting means for connecting the ring holders to each other when the neck is inserted into the ring holders.

18. A display apparatus, comprising:
- an electron gun unit including a main body and a boss part protruding from a rear part of the main body, said boss part having a plurality of pins disposed thereon and extending rearwardly therefrom;
- a video unit including a video printed circuit board (PCB) and a boss holder vertically disposed on the video PCB for connection to the boss part of the electron gun unit so as to transmit a video signal from the video PCB to the electron gun unit; and
- a neck fixing holder provided on the video PCB for fastening the video PCB to a neck of a cathode ray tube bulb.

19. The display apparatus according to claim 18, wherein the neck fixing holder comprises a pair of ring holders into which the neck is inserted.

20. The display apparatus according to claim 19, further comprising connecting means for connecting the ring holders to each other when the neck is inserted into the ring holders.

* * * * *